United States Patent

Porrvik

[11] Patent Number: 5,902,834
[45] Date of Patent: May 11, 1999

[54] METHOD OF MANUFACTURING PARTICLES, AND PARTICLES THAT CAN BE PRODUCED IN ACCORDANCE WITH THE METHOD

[75] Inventor: Ingrid Porrvik, Uppsala, Sweden

[73] Assignee: Pharmacia Biotech AB, Upsala, Sweden

[21] Appl. No.: 08/737,488

[22] PCT Filed: May 10, 1995

[86] PCT No.: PCT/SE95/00516

§ 371 Date: Dec. 12, 1996

§ 102(e) Date: Dec. 12, 1996

[87] PCT Pub. No.: WO95/31485

PCT Pub. Date: Nov. 23, 1995

[30] Foreign Application Priority Data

May 15, 1994 [SE] Sweden ................................. 9401670
Jul. 15, 1994 [SE] Sweden ................................. 9402483

[51] Int. Cl.$^6$ ............................................. C08J 9/28
[52] U.S. Cl. ................................. 521/62; 521/56; 521/63; 521/64; 521/149; 521/150
[58] Field of Search ......................... 521/62, 63, 64, 521/56, 150, 149

[56] References Cited

U.S. PATENT DOCUMENTS

| | | | |
|---|---|---|---|
| 3,206,441 | 9/1965 | von Bonin et al. | 521/63 |
| 3,244,772 | 4/1966 | von Bonin et al. | 521/63 |
| 3,255,127 | 6/1966 | von Bonin et al. | 521/63 |
| 4,522,953 | 6/1985 | Barby et al. | 521/63 |
| 5,021,462 | 6/1991 | Elmes et al. | 521/63 |
| 5,189,070 | 2/1993 | Brownscombe et al. | 521/64 |
| 5,200,433 | 4/1993 | Beshouri | 521/64 |
| 5,252,621 | 10/1993 | Hodge | 521/65 |
| 5,583,162 | 12/1996 | Li et al. | 521/56 |
| 5,653,922 | 8/1997 | Li et al. | 264/4.3 |

FOREIGN PATENT DOCUMENTS

| | | |
|---|---|---|
| 0060138 | 9/1982 | European Pat. Off. . |
| 0467528 | 1/1992 | European Pat. Off. . |
| 1160616 | 1/1964 | Germany . |

*Primary Examiner*—Morton Foelak
*Attorney, Agent, or Firm*—Birch, Stewart, Kolasch and Birch, LLP

[57] ABSTRACT

A method of producing open porous spherical particles by polymerizing monovinyl monomers and divinyl monomers and/or polyvinyl monomers (cross-linkers) in an emulsion with the aid of an initiator. The method is characterized by the steps of (i) preparing a w/o/w emulsion which comprises an aqueous phase having emulsified therein droplets which contain a water-in-oil emulsion, wherein the oil phase in the droplets includes vinyl monomers and an emulsifier which provides an inverse emulsion and the droplets have a diameter smaller than 2,000 $\mu$m, and wherein the total amount of water is between 75–99% (w/w); and (ii) thereafter initiating polymerization and isolating the particles, optionally after sieving, from the reaction mixture after the polymerization process. A population of open spherical porous polymer particles which have a diameter within the range of 50 $\mu$m–2,000 $\mu$m and include a pore system comprising (a) spherical hollows whose diameters are <$\frac{1}{5}$ of the particle diameter; and (b) connecting pores whose opening diameters to the spheres and on the particle surfaces are about $\frac{1}{10}$–$\frac{1}{3}$ of the diameter of the spheres.

18 Claims, No Drawings

METHOD OF MANUFACTURING PARTICLES, AND PARTICLES THAT CAN BE PRODUCED IN ACCORDANCE WITH THE METHOD

DESCRIPTION OF THE TECHNICAL FIELD AND THE RELEVANT PRIOR ART

The invention is concerned with novel macroporous particles which have an open pore structure, and also with a method of manufacturing such particles. The particles can be used as a supportive matrix in chromatography and in the solid-phase synthesis of oligopeptides and oligonucleotides, and also as microcarriers in the cultivation of cells, e.g. anchorage-dependent cells, and as a solid phase in heterogenic immunoassays, particularly when the particles are in a hydrophilic form.

In the context of the present invention, by spheres is meant spherical cavities and spherical particles, and also spheroidal forms thereof which are gently rounded and slightly elongated.

There has been a pronounced need of macroporous particles and their production for these applications for a number of years. Increased macroporosity will result in an improved flow through the particles, which, in turn, results in improved kinetics.

The inventive particles can be produced by polymerization in w/o/w emulsions. This type of emulsion can be considered as an aqueous emulsion of oil droplets which, in turn, contain a dispersed aqueous phase. W/o/w emulsions have earlier been used for the production of porous particles (Tioxide Group Service Ltd., GB-A-2,245,575). Particles have also been produced by cross-linking unsaturated polyesters with unsaturated monmers, such as styrene and divinylbenzene.

The inventive method employs the use of so-called inverse emulsions (water in oil emulsions, w/o emulsions) with a high internal phase content (=high internal phase emulsions). Polymerization in the oil phase of inverse emulsions has earlier been described by Sherrington (EP-A-60138) and Bayer AG (DE-A-1160616), among others. Relevant inverse emulsions will normally contain >60%, preferably >75%, water (w/w) and emulsifiers which are distributed to the oil phase (the monomer phase). Emulsifiers which provide such inverse emulsions will normally have an HLB value >2, preferably between 2–6. The HLB values can only be used as guidelines for determining whether or not an emulsifier is suited to a given type of inverse emulsion. The aforesaid ranges do not therefore exclude the possibility that emulsifiers with HLB values >6 will also provide inverse emulsions having a high content of internal phase.

DISCLOSURE OF THE INVENTION

In accordance with the inventive method, open, porous spherical particles are produced by polymerizing monovinyl monomers and polyvinyl monomers (cross-linkers) in an emulsion with the aid of the appropriate initiator. The method is characterized by i. preparing a w/o/w emulsion which comprises an aqueous phase having emulsified therein droplets which contain a water-in-oil emulsion, wherein the oil phase in the droplets includes vinyl monomers and emulsifiers which provide an inverse emulsion and the droplets have a diameter smaller than 2,000 µm, and wherein the total amount of water is between 75–99% (w/w), preferably 90–99%; and ii. thereafter initiating polymerization and isolating the particles, optionally after sieving, from the reaction mixture after the polymerization process.

Polymerization takes place in the intermediate phase, i.e. in the oil phase of the droplets.

In the case of the preferred embodiments, the w/o/w emulsion is formed in two stages. In Stage 1, there is prepared a water-in-oil emulsion (w/o emulsion) in which the oil phase constitutes about 5–45%, preferably 10–30% (w/w). Vinyl monomers and emulsifier are mixed with water in Stage 1, so as to form a water-in-oil emulsion, preferably while stirring. In Stage 2, the remainder of the water is added so as to form a w/o/w emulsion. Stirring of the mixture is normally interrupted while adding the remainder of the water and then recommenced. The initiator is preferably added in Stage 1 and may be either water-soluble or oil-soluble.

The oil phase (the intermediate phase) in the droplets normally contains emulsifier, vinyl monomer (e.g. mono- and difunctional monomers) and, when applicable, an oil-soluble initiator. The amounts of these components mostly add up to essentially 100% of the oil phase. The intermediate phase may potentially also include water immiscible solvent and additive substances.

Agitation is normally avoided during the polymerization stage, which means that the particles will be obtained in the form of a loosely-combined cake. Agitation of the system during the process of polymerization is liable to result directly in particles in a free form, and it may then be beneficial to add a water-soluble emulsifier in stage 2.

When the particles produced are to be used for one of the applications mentioned in the introduction, the conditions under which polymerization takes place will preferably be adapted to form essentially particles having a diameter of 10–2,000 µm (with preference for the range of 50–2,000 µm). The sizes of the major part of the droplets (w/o emulsion) in the w/o/w emulsion will therefore lie within this range. Particle size is determined by, among other things, relative quantities and the type of the components added (monofunctional and polyfunctional monomers, emulsifier, water content and stirring conditions).

Normally, the size of the inventive particles is of minor importance in the case of chromatography, particularly in the case of initial purification in different downstream processors, since the extremely high porosity of the particles will permit a convective flow through a bed comprised of said particles. However, the particles should not be too small. A suitable size is from 100 µm–700 µm, such as 300 µm–700 µm.

In the case of carriers for cell cultivation, a suitable particle size is 100 µm–1,000 µm, preferably 200 µm–1,000 µm, with a maximum size distribution of 100 µm. In the case of preferred forms, the pore size is at least 30 µm, preferably between 30 µm–50 µm.

The particle size may be between 50 µm–2,000 µm in the case of solid-phase-synthesis.

The porosity of formed particles is determined by the same variables as the particle size. Particles having very high porosity can be produced by means of the inventive method, for instance porosities >80%, such as >90%. The pore system is built up of cavities in the form of spheres with connecting pores between the spheres. The spheres will normally have a diameter of <$\frac{1}{5}$ of the diameter of the particles, which normally means that the diameter of the spheres is between 1 µm–25 µm. The diameter of the connecting pores is normally about $\frac{1}{10}$–$\frac{1}{3}$ of the diameter of the spheres, often between 0.5 µm–10 µm. Particles that have been produced hitherto have had a surface area/g of 5–30 m²/g, although the method is able to produce much larger surface areas, such as surface areas up to 50 m²/g. The surface area is measured by the aid of $N_2$-adsorption (BET method) and the porosity can be estimated from SEM-images (pore size) and the water content of the emulsion produced in Stage 1 (pore volume).

The particle-size dependency and the porosity dependency (pore volume, surface area, pore size) on stirring, emulsifier, monomer and water content are complex. A guide to the selection of proper conditions for producing a given particle can be obtained from the experimental part and from the summary of the results.

The emulsion shall always contain an emulsifier which will provide an inverse emulsion together with water and oil phase (see the aforegoing and DE-A-1160616 and EP-A-60138). Specific examples of suitable emulsifiers are found among emulsifiers which are (a) monoesters between $C_{10-25}$ carboxylic acids and sugar alcohols, and (b) block copolymers which contain both hydrophilic and hydrophobic segments. The amount of emulsifier capable of providing the type of inverse emulsion concerned will normally be <30%. Normally, 5% (w/w) constitutes a lowest limit. As new, more effective emulsifiers are discovered, it is likely that the lowest limit at which inverse emulsions can be created will be lowered, for instance down to 2–4% (w/w). These percentage values relate to the amount of emulsifier in relation to the oil phase used in Stage 1.

The polymerization is normally a free radical type polymerization (vinyl polymerization). The monomers to be polymerized will be insoluble or essentially insoluble in water. Optionally, a minor quantity of monomers may have a lipophilic-hydrophilic balance such that the monomers will orientate themselves in the phase boundary with their polymerizable ends facing the oil phase and their hydrophilic ends facing the water phase (reactive surfactant).

The monomer shall include one or more alkene groups, i.e. a substituted or non-substituted vinyl group (monofunctional, difunctional and polyfunctional vinyl monomers). The most common substituent on suitable vinyl groups ($CH_2=CH-$) is methyl that may replace a hydrogen at either or both carbon atoms. The vinyl group of the vinyl monomer may be bound directly to the carbonyl group in an ester or carboxy function. Monoacrylate ester or diacrylate ester or corresponding methacrylate esters, vinyl benzene or divinyl benzene can be mentioned in particular. Normally, the quantity ratio between difunctional plus polyfunctional vinyl monomers and monofunctional vinyl monomers in the w/o/w emulsion is not critical, and may be in the range 0.5–100%. The use of hydrolysis-stable monomers is preferred, i.e. the use of monomers which contain solely carbon-carbon-bonds, carbon-hydrogen-bonds or ether-bonds. Methacrylate esters and methacrylamides are preferred in certain cases.

When the monomer also exhibits functional groups, for instance oxirane in addition to the polymerizable group, these functional groups can be used to derivate the pore surfaces of the particles. An example in this regard is glycidyl methacrylate.

The polymerization process can be initiated by different types of radical initiators. Thermic initiators are preferred. Such initiators will have their efficiency in the range 30° C.–90° C., where the lower limit is determined by the fact that lower activation temperatures lead to spontaneous activation at room temperature, whereas the upper limit is determined by the fact that it is undesirable for water to disappear during the polymerization process. The initiators may either be water-soluble or oil-soluble. Examples of thermic initiators are azo-compounds (for instance, the initiator used in the experimental part (oil-soluble), hydrophobic peroxides (oil-soluble), persulphates (water-soluble), different redox systems, e.g. Fenton's reagent (hydrogen peroxide+$Fe^{2+}$, water-soluble)).

Polymerization may also be initiated via UV radiation, γ-radiation and electron irradiation, etc.

The aforesaid emulsions are suitably created at room temperature or in the immediate vicinity thereof. Although the temperature may vary during the polymerization process, it will be such as to ensure that the w/o/w emulsion will not collapse. When thermic initiators are used, it is necessary to raise the temperature in order for polymerization to begin. Generally, the temperature should be held at at least 10° C. beneath the boiling point of water and the boiling point of other components (i.e. normally beneath 90° C.). A raise in temperature will often destabilize the emulsions concerned.

The pore surfaces of produced particles can be made hydrophilic and derivated to present a desired structure. This can be achieved through adsorption of a suitable reagent which exhibits the structure in question. The adsorbed reagent may in a later stage be crosslinked and/or covalently coupled to the surface in order to ensure a stable layer. Alternatively, there can be used in the polymerization stage a monomer which, in addition to an alkene group, also contains a functional group that can be used for chemical derivation of the pore surface. For instance, epoxy groups can be introduced via glycidyl methacrylate for later use in coupling hydroxyl compounds or amine-containing compounds to the particle surfaces (internal and external surfaces). Polymeric hydrophilic compounds that have been adsorbed or covalent attached to the particles may subsequently be crosslinked. Thus, according to one aspect of the invention, porous particles are produced which carry on their internal and external surfaces hydrophilic groups (primarily alcoholic and/or phenolic hydroxyl groups and/or primary, secondary or tertiary amine groups) which have been introduced by adsorption or covalent bonding of a compound containing the groups. The compounds concerned may have a polymeric structure.

The invention is further defined in the following claims.

EXPERIMENTAL PART—SYNTHESIS

General procedure: An inverse emulsion (w/o) was prepared by mixing monofunctional vinyl monomers, difunctional vinyl monomers, emulsifier and initiator to provide an homogenous solution, whereafter water was added dropwise while vigorously stirring the mixture (Stage 1). The ratio between the organic phase and the water phase varied from between 10–40% (w/w) (see Table 1). Stirring of the mixture was then stopped and water was added so that the ratio between the organic phase and water varied from 2.5 to 20% (w/w) between the different experiments (see Table 1). Stirring of the mixture was then recommenced, resulting in a three-phase emulsion (w/o/w) in most cases. Polymerization was effected by heating the emulsion in a hot-air oven to a temperature of about 50–70° C. The particles were characterized by SEM-analysis and the specific surface area of the particles was determined by $N_2$-adsorption. The exact components of the reaction mixtures are set forth in Table 1.

1. Example of a specific procedure: 5.4 g of styrene (Merck, purified on Al oxide), 5.4 g divinyl benzene (Merck, purified on Al oxide), 0.9 g Span® 80 (sorbitan monooleate; Fluka), 0.3 g Hypermer® (ICI) and 0.2 g V65 (2,2'-azobis(2,4-dimethylvaleronitrile); Polyscience Inc.) were mixed to a homogenous solution and 50 g water (distilled) were added drop-wise while vigorously stirring the solution. A further 58 g water were then added in one single amount. The solution was stirred vigorously for a further fifteen minutes or thereabouts. The emulsion was polymerized in a hot-air oven at 50° C. overnight, and thereafter at 70° C. for five hours. This resulted in a cake of loosely-bound particles. The cake was broken up and placed in a 1-liter glass bottle and water was added. The bottle was placed in an ultrasonic bath for fifteen minutes, after which most of the particles had separated from one another. Particles which were larger than 500 μm and smaller than 100 μm were removed by sieving. The remaining particles were washed with acetone on glass filters and thereafter rinsed copiously with water. SEM showed that the particles contained very large pores.

2. Example of specific procedure: 2.7 g styrene (Merck, purified on Al oxide), 5.4 g divinyl benzene (Merck, purified on Al oxide), 2,7 g GMA (glycidyl methacrylate; Röhm), 0.9 g Span® 80 (sorbitan monoleate; Fluka), 0.3 g Hypermer® (ICI) and 0.2 g V65 (2,2'-azobis)2,4-dimethylvaleronitrile; Polyscience Inc.) were mixed into an homogenous solution and 50 g of distilled water were added drop-wise while vigorously stirring the mixture. Thereafter 58 g of water was added in one portion. Vigorous stirring of the mixture was continued for a further fifteen minutes, or thereabouts. The emulsion was polymerized in a hot-air oven at 50° C. overnight, and thereafter at 70° C. for five hours. This resulted in a cake of loosely-bound particles. The cake was broken up and placed in a 1-liter glass bottle and water was added. The bottle was placed in an ultrasonic bath for fifteen minutes, whereafter most of the particles had separated from one another. Particles and aggregate greater than 500 μm and smaller than 100 μm were removed by sieving. The remaining particles were washed with acetone on a glass filter and then rinsed copiously with distilled water. SEM showed that the pores were smaller than the pores of the purely styrene/DBV particles.

3. Example of the introduction of DEAE groups to porous particles containing oxirane groups: DEAE dextran (20 g) was diluted to 100 g with distilled water (slight heating) in a three-necked 500 ml flask. 146.6 g of drained particles from Example 2 above (but not dry suctioned) were added to the system and the resultant slurry was stirred very gently at 60° C. (rotary stirrer). 10 g of NaOH pastilles (about 1M) and 220 mg of sodium borohydride were added after thirty minutes, whereafter the system was gently stirred or agitated for a further four hours at 60° C. The system was then brought to a neutral pH by adding acetic acid, whereafter the particles were washed copiously with water (5 liters).

4. Surface modification via adsorption:

Coating with phenyldextran: Phenyldextran (5.0 g) (substitution degree 0.2 phenyl groups per monosaccharide) was dissolved in distilled water (50 ml) while vigorously stirring the system. Macroporous particles produced in accordance with the inventive method (journal number 48100) were then added and the mixture was stirred carefully with a suspended stirrer. Finally, the particles were washed carefully with distilled water on a glass filter.

Cross-linking of phenyldextran: Particles (15 g) from a preceding stage were placed in a reaction vessel together with 50 ml of 1M NaOH, 1 ml of epichlorohydrin and 0.05 g of sodium borohydride. The reaction was stirred at room temperature for two hours, whereafter the reaction product was washed with distilled water on a glass filter.

Epichlorohydrin activation: The particles from a preceding stage (15 g) were placed in a reaction vessel together with 15 ml of distilled water, 4 ml of epichlorohydrin, 0.05 g of sodium borohydride and 1.8 g of NaOH (Prolabo). The reaction was allowed to proceed for two hours at 24° C., whereafter the particles were washed with distilled water on a glass filter.

Aminodextran coupling: The particles from a preceding stage (15 g) were placed in a reaction vessel containing aminodextran (1.0 g, N-content 0.4% dissolved in 10 ml of distilled water followed by 0.05 g of sodium borohydride. The pH was adjusted to 11.5 with 0.1M NaOH, whereafter the reaction was allowed to proceed overnight at 50° C. Finally, the particles were washed with distilled water on a glass filter. The surface treated particles exhibited good wetting properties when in contact with water. Elementary analysis showed that the particles contained 6% aminodextran after coupling.

SUMMARY OF THE RESULTS

The results of SEM-analysis of prepared non-derivated particles are set forth in Table 1. The results show that it is possible to produce particles of varying porosity by means of the inventive method. The results also indicate that macroporous particles can be obtained when Stage 1 (production of w/o emulsion) is effected with a dry solids content that lies in the range of about 5–35%, preferably within the range of 10–30% (w/w). With regard to Stage 2, the results indicate that a more open pore structure is obtained when the dry solid content decreases.

The results also show that in order to obtain macroporous particles, the difference in the dry solids content between Stages 1 and 2 should be more than 5%.

TABLE 1

| Journal No. | Stage 1 w/o dry solids (%) | Stage 2 w/o/w dry solids (%) | Surface area m²/g | SEM analysis visual assessment |
|---|---|---|---|---|
| 55208[a] | 20 | 10 | 13 | Round porous particles, size ca 100–500 μm, pore size ca 1–10 μm |
| 48100[b] | 20 | 10 | 25 | Round porous particles, size ca 50–300 μm, pore size ca 1–20 μm |
| 69018[b] | 20 | 5 | | Round porous particles, size ca 50–300 μm, pore size ca 1–10 μm |
| 90721:1[b] | 20 | 2.5 | | Round porous particles, size ca 50–300 μm, pore size ca 1–20 μm |
| 55219:1[a] | 10 | 6.7 | | Porous coherent cake, with a few particles |
| 55219:2[b] | 10 | 6.7 | | Porous irregular particles, size ca 0.5–1 μm, pore size ca 1–10 μm |
| 69007[b] | 10 | 5 | | Porous irregular particles, size ca 0.5–1 mm, pore size ca 1–40 mm |
| 55219:5[a] | 10 | 3.4 | 25 | Round porous particles, size ca 100–500 μm, pore size ca 1–10 μm |
| 55219:6[b] | 10 | 3.4 | | Porous coherent cake, with a few particles |
| 55222:1[a] | 10 | 2.5 | 18 | Round porous particles, size ca 50–500 μm, pore size ca 1–10 μm |
| 55222:2[b] | 10 | 2.5 | 27 | Round porous particles, size ca 50–500 μm, pore size ca 1–20 μm |

TABLE 1-continued

| Journal No. | Stage 1 w/o dry solids (%) | Stage 2 w/o/w dry solids (%) | Surface area m²/g | SEM analysis visual assessment |
|---|---|---|---|---|
| 55219:3[a] | 28.5 | 10 | 5.5 | Round porous particles, size ca 50–100 μm, pore size <10 μm, fine particles although also a number of small (5 μm) dense particles |
| 55219:4[b] | 28.5 | 10 | 30 | Round essentially dense particles size ca 50–100 μm, |
| 55219:7[a] | 28.5 | 5 | 15 | Round porous particles, size ca 50–100 μm, pore size <10 μm, fine particles although also a number of small (5 μm) dense particles |
| 55219:8[b] | 28.5 | 5 | 12 | Round particles with few pores, size ca 50–100 μm, pore size <5 μm |
| 69009[b] | 15 | 10 | | Porous coherent cake with a few particles |
| 69010[b] | 15 | 5 | | Round porous particles, size ca 100–500 μm, pore size ca 1–10 μm |
| 55222:3[a] | 5 | 2.5 | | Porous coherent cake with a few particles |
| 55222:4[b] | 5 | 2.5 | | Porous coherent cake with a few particles |
| 55222:5[a] | 40 | 5 | | Essentially dense particles, size ca 50–100 μm |
| 55222:6[b] | 40 | 5 | | Essentially dense particles, size ca 50–100 μm |
| 55222:7[a] | 40 | 10 | 25 | Essentially dense particles, size ca 50–100 μm |
| 55222:8[b] | 40 | 10 | | Essentially dense particles, size ca 50–100 μm |
| 55222:9[a] | 40 | 20 | | Round particles with few pores, size ca 50–100 μm, pore size ca <5 μm |
| 55222:10[b] | 40 | 20 | | Essentially dense particles, size ca 50–100 μm |
| 90722[c] | 17 | 4 | | Round porous particles, size ca 50–300 μm, pore size ca 1–10 μm |

With regard to a and b, the organic phase consists in 10% emulsifier (a mixture consisting in 75% Span ® 80 and 25% Hypermer B261), 89% monomer mixture and 1% initiator (percent by weight).
[a]= the monomer mixture consisting of 25% glycidyl methacrylate, 25% styrene and 50% divinyl benzene.
[b]= the monomer mixture consisting of 50% styrene and 50% divinyl benzene.
With regard to c, the organic phase consists in 20% emulsifier (a mixture consisting in 75% Span 80 and 25% Hypermer ® B261), 78.5% monomer mixture and 1.5% initiator (percent by weight).
[c]= monomer mixture consisting in 50% styrene and 50% divinyl benzene.

EXPERIMENTAL PART—CHROMATOGRAPHY

Chromatography evaluation.
Material and equipment: DEAE adsorbent according to example 3 above.
Proteins: Bovine serum albumin (BSA, iso-electric point 5.0; Sigma), β lactoglobulin (iso-electric point 5.2; Sigma) and myoglobin from horse heart (iso-electric point 7.0; Sigma).
Buffers: 50 Mm Tris-HCl, pH=7.5, 20 mM Tris-HCl, pH=7.5, 10 mM Tris-Hcl, pH=7.5, 10 mM Tris-HCl, pH=8.3.
Eluants: 1M NaCl, 1M NaCl with 10 mM Tris-HCl. pH=7.5, 1M NaCl with 10 mM Tris-HCl, pH=8.3 and 1.0M NaOH.
Column: XK 16/20.
Pumps: Two (2) P 6000 (Pharmacia Biotechnology AB, Uppsala, Sweden).
Hoses: inner diameter 1.2 mm.
Valves: One (1) IMV 7 and four (4) IMV8.
(All equipment came from Pharmacia Biotechnology AB, Uppsala, Sweden).
Measurement of the pressure/flow properties of the gel:
  Drained DEAE particles according to the above (20 g) were mixed with 10 ml buffer (50 mM Tris buffer pH 7.5) and were poured into a column (XK 16/20). After the gel had settled and had compacted, the gel height was 12.7 cm. Tris buffer (50 mM Tris buffer pH 7.5) was pumped through the column at a linear rate of flow (300 cm/h). The pressure across the system and column was noted, as was also the pressure across solely the system. The pressure across the column was calculated by subtracting the pressure across solely the system from the combined system plus column pressure. When noting the pressure, the flow rate was increased successively until the gel collapsed and the pressure quickly disappeared.
Determination of the available and the dynamic protein capacity:
  Drained DEAE particles according to the above (20 g) were pored into a column (XK 16/20). The gel was equilibrated with binding buffer, whereafter a solution of BSA (2.0 g/ml) was applied to the column (the experiments were repeated with each of the four buffers). After having plotted a complete breakthrough curve, the non-bound protein was washed away from the column. The bound protein was eluted with 1M NaCl. The experiments were carried out at linear flow rates of 150 and 1,500 cm/h. Plate numbers and asymmetry factors were determined.
  The available capacity of the gel was calculated by dividing the amount of BSA eluted with 1M NaCl by the gel volume. The dynamic binding capacity (DBC) was given as the amount of protein adsorbed per milliliter of gel when the UV reading was 1% and 50% of the protein solution indication respectively. The gel volume was subtracted from the breakthrough curve, since the time taken for the protein to wander through the column corresponded to an excessively large proportion of the dynamic capacity.
Determination of separation performance of the gel:
  Drained DEAE gel particles according to the above (20 g) were packed in a column to a height of 12 cm. The gel was equilibrated with a binding buffer (10 mM Tris-HCl pH 8.3), whereafter there were applied 100 ml of a protein mixture containing 50 mg of each of two proteins. After having washed non-bound protein from the column, the bound protein was eluted with an NaCl gradient in a Tris solution (10 mM Tris) from 0 to 1M NaCl. A linear flow rate of 100 cm/h was applied in the experiments.
The protein mixtures were:
1. BSA and beta-lactoglobulin with binding buffer 10 mM Tris, pH 7.5.
2. BSA and myoglobin with binding buffer 10 mM Tris, pH 7.5.
3. MSA and myoglobin with binding buffer 10 mM Tris, pH 8.3.
Plate numbers and asymmetry factors were determined.
RESULTS
Determination of the pressure and the flow properties of the gel: The gel exerted a counterpressure of 10 bars at the linear flow rate of 3,000 cm/h. The gel collapsed at a flow rate of 4,500 cm/h and the pressure quickly disappeared.

Determination of the available and dynamic protein capacity: The plate number per meter of the column was 990, while the asymmetry factor was 1.05. The following values were obtained when determining the capacity of the DEAE particles with different buffers and different flow rates:

1. Buffer: 10 mM Tris-HCl, pH 7.5
   Flow rate: 150 cm/h
   Available capacity: 4.0 mg/ml
   DBC 1%: 4.0 mg/ml
   DBC 50%: 5.7 mg/ml
2. Buffer: 20 mM Tris-HCl, pH 7.5
   Flow rate: 150 cm/h
   Available capacity: 5.4 mg/ml
   DBC 1%: 3.6 mg/ml
   DBC 50%: 5.4 mg/ml
3. Buffer: 10 mM Tris-HCl, pH 7.5
   Flow rate: 1,500 cm/h
   Available capacity: 8.3 mg/ml
   DBC 1%: 4.4 mg/ml
   DBC 50%: 8.0 mg/ml
4. Buffer: 50 mM Tris-HCl, pH 7.5
   Flow rate: 1,500 cm/h
   Available capacity: 4.6 mg/ml
   DBC 1%: 2.9 mg/ml
   DBC 50%: 5.6 mg/ml Determination of the separation performance of the gel: In the experiment with a mixture of BSA and beta-lactoglobulin, the proteins were eluted in the same top. The most effective adsorption of BSA and myoglobin on the gel was achieved when using the Tris solution with pH 8.3. The proteins were separated from one another, irrespective of buffer. The plate number per meter of column was 710 and the asymmetry factor was 1.14.

CONCLUSION

The inventive particles tested had a dynamic capacity that was independent of flow rate, at least up to 1500 cm/h, indicating fast kinetic and little diffusional resistance, which will be of great benefit for e.g. chromatography in early stages (capture).

The inventive particles tested were unable to manage the same high flow rates as those managed by the chromatographic matrices BigBeads and Streamline® (Pharmacia Biotech AB, Uppsala, Sweden). The tested particles were able to separate two proteins having different iso-electric points. The protein capacity was low.

I claim:

1. A method of producing spherical particles consisting essentially of open pores, by polymerizing monovinyl and divinyl monomers and/or polyvinyl monomers (cross-linkers) in an emulsion with the aid of an initiator, comprising
   i. preparing a w/o/w emulsion which comprises an aqueous phase having emulsified therein droplets which contain a water-in-oil emulsion, wherein the oil phase in the droplets includes vinyl monomers and an emulsifier which provides an inverse emulsion and the droplets have a diameter smaller than 2,000 μm, and wherein the total amount of water present is between 75–99% (w/w); wherein the w/o/w emulsion is produced in two stages, such that a water-in-oil emulsion (w/o emulsion) is prepared in Stage 1, wherein the oil phase comprises about 5–45%, and Stage 2 involves adding the remainder of the water so as to form the w/o/w emulsion; and
   ii. thereafter initiating polymerization and isolating the particles from the reaction mixture after the polymerization process.

2. The method according to claim 1, wherein the isolated particles have a size (diameter) in the range of 10 μm–2,000 μm and in that the pore system of the particles is built-up of spherical hollows which are interconnected by pores, wherein
   a. the diameter of the spheres is <⅕ of the diameter of the particles; and
   b. the diameter of the connecting pores is about ¹⁄₁₀×–⅓ of the diameter of the spheres.

3. A method according to claim 1, wherein the initiator is a thermic initiator for radical polymerization with an activation temperature in the range of 30–90° C.

4. The method according to claim 2, wherein the emulsifier constitutes <30% of the oil phase of the emulsion in Stage 1.

5. The method according to claim 1, further comprising selecting the vinyl monomers from among compounds where the vinyl group is bound directly to a carbonyl carbon in an ester group or a carboxy group or to an aromatic ring.

6. The method according to claim 1, wherein the emulsifier includes compounds chosen from among (a) monoesters or diesters between $C_{10-25}$ carboxylic acids and sugar alcohols and (b) block copolymers which contain both hydrophilic and hydrophobic segments.

7. A population consisting essentially of open spherical porous polymer particles having a diameter within the range of 50 μm–2,000 μm and which include a pore system comprising
   a. spherical hollows whose diameters are <⅕ of the particle diameter; and
   b. connecting pores whose opening diameters to the spheres and on the particle surfaces are about ¹⁄₁₀–⅓ of the diameter of the spheres.

8. The population of spherical particles according to claim 7, wherein the polymer is built-up of monomer units chosen from among vinyl monomers which are preferably chosen from among compounds where the vinyl group is bound directly to a carbonyl carbon included in an ester group or carboxy group, or to an aromatic ring.

9. A population of open spherical porous polymer particles having a diameter within the range of 50 μm–2,000 μm and which include a pore system comprising
   a. spherical hollows whose diameters are <⅕ of the particle diameter: and
   b. connecting pores whose opening diameters to the spheres and on the particle surfaces are about ¹⁄₁₀–⅓ of the diameter of the spheres,
characterized in that the population is produced in accordance with claim 1.

10. The method according to claim 1 further comprising sieving the reaction mixture.

11. The method according to claim 1 wherein the oil phase in Stage 1 comprises about 10–30% (w/w).

12. The method according to claim 3, wherein the initiator is of azo type.

13. The method according to claim 5, wherein the ester group is selected from monoacrylate esters, or diacrylate esters, methacrylate esters.

14. The method of claim 5 wherein the aromatic ring is vinyl benzene or divinyl benzene.

15. A population of spherical particles according to claim 8 wherein the ester group is selected from monoacrylate esters, diacrylate esters or methacrylate esters.

16. A population of spherical particles according to claim 8 wherein the aromatic ring is vinyl benzene or divinyl benzene.

17. A support material for liquid chromatography, solid phase synthesis or cell culture carrier comprising the population of particles of claim 7.

18. The method according to claim 1 wherein the total amount of water present is between 90–99% (w/w).

* * * * *